United States Patent [19]

Pierce

[11] 4,008,685
[45] Feb. 22, 1977

[54] ELECTROSTATIC FLUIDIZED BED BUILD CONTROL

[75] Inventor: Robert E. Pierce, Abingdon, Va.

[73] Assignee: Westinghouse Electric Corporation, Pittsburgh, Pa.

[22] Filed: Apr. 20, 1976

[21] Appl. No.: 678,579

[52] U.S. Cl. .......................... 118/629; 118/DIG. 5
[51] Int. Cl.² ........................................ B05B 5/02
[58] Field of Search .......... 118/DIG. 5, 49.1, 50.1, 118/300, 304, 405, 621, 624, 627, 629, 634; 239/3, 15; 317/2 R, 262 R

[56] References Cited

UNITED STATES PATENTS

| | | | |
|---|---|---|---|
| 3,019,126 | 1/1962 | Bartholomew | 118/621 X |
| 3,227,135 | 1/1966 | Brooks | 118/DIG. 5 |
| 3,566,833 | 3/1971 | Beebe et al. | 118/634 |
| 3,590,776 | 7/1971 | Tudor | 118/50.1 |
| 3,690,298 | 9/1972 | Venturi | 118/629 |
| 3,865,079 | 2/1975 | Kellams et al. | 118/621 |
| 3,916,826 | 11/1975 | Knudsen | 118/629 |

Primary Examiner—Louis K. Rimrodt
Attorney, Agent, or Firm—R. D. Fuerle

[57] ABSTRACT

An improved apparatus is disclosed for controlling the build on wire moving in a vertical electrostatic fluidized bed which has opposing vacuum chambers for controlling the position of the cloud of powder in the bed. Each vacuum chamber is provided with an opening to the atmosphere and with means for controlling the size of the opening. By "spoiling" the vacuum in this manner the position of the cloud can be more precisely controlled thereby producing a more uniform coating on the wire.

5 Claims, 2 Drawing Figures

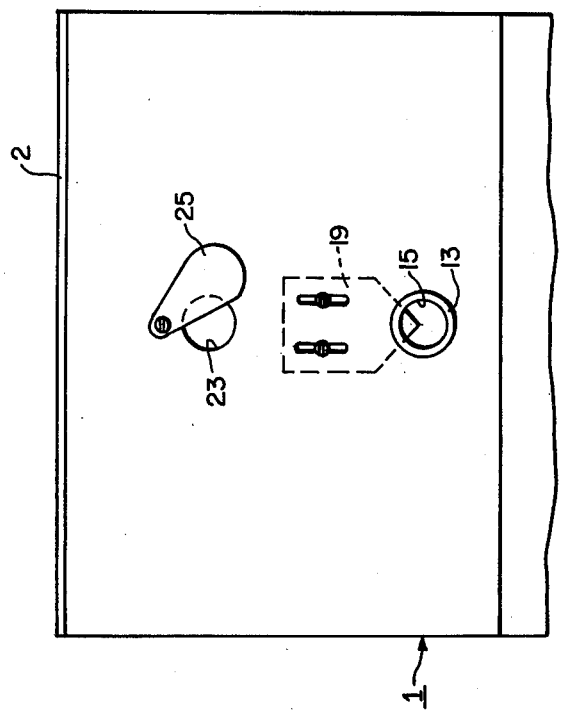
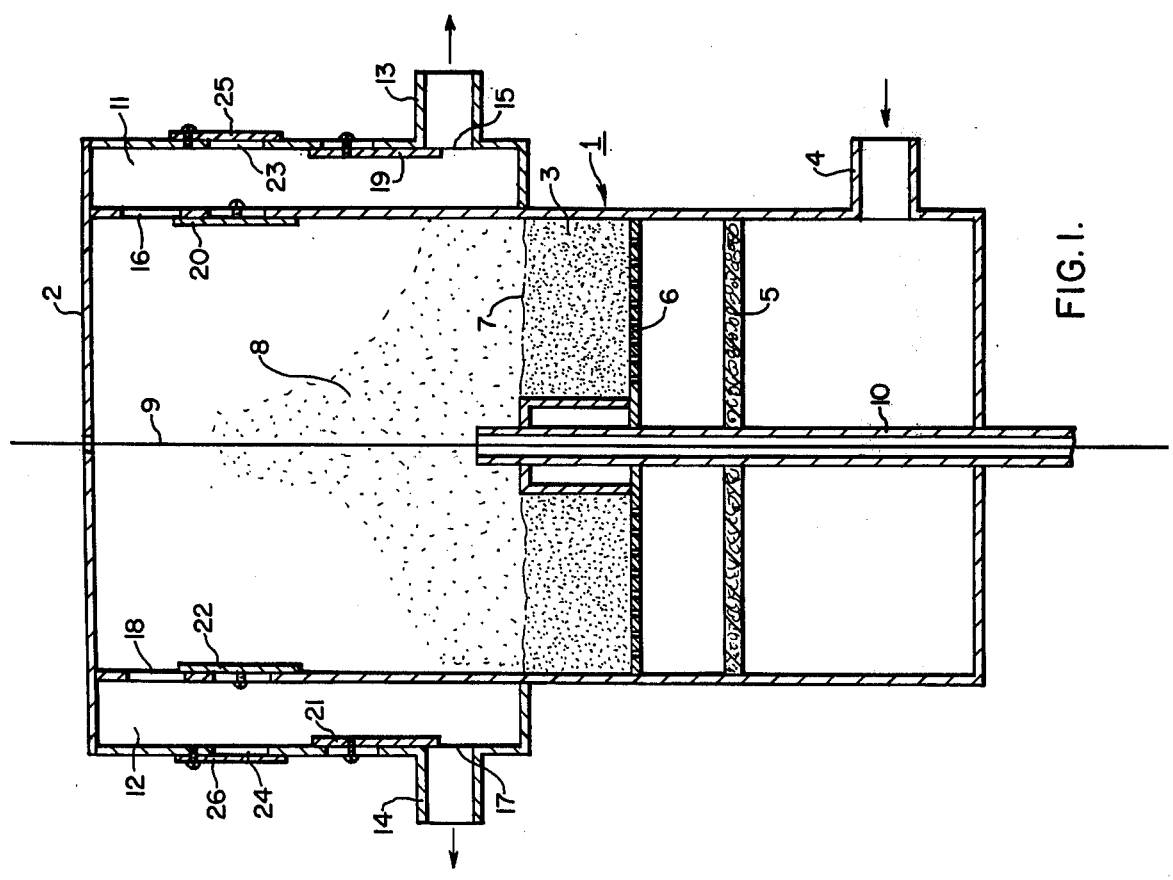

ELECTROSTATIC FLUIDIZED BED BUILD CONTROL

BACKGROUND OF THE INVENTION

In an electrostatic fluidized bed a moving grounded wire or other elongated member is coated with a cloud of charged resin particles which forms above the level of the fluidized powder. The wire then moves into an oven where the particles are fused.

A recent development has been to position a vacuum chamber on each side of the bed to draw air from the inside of the bed, thereby controlling the position of the cloud of particles around the wire. The purpose of this arrangement was to provide a uniform cloud and therefore a uniform coating on the wire. The vacuum chambers were provided with dampers for controlling the amount of vacuum.

SUMMARY OF THE INVENTION

I have found that the damper arrangements on the presently-existing vacuum chambers is too coarse to precisely control the position of the cloud in the fluidized bed. That is, a small change in a damper produces too large of a change in the position of the cloud.

I have further found, however, that a fine adjustment on the position of the cloud can be obtained by venting or spoiling the vacuum to the atmosphere and controlling the amount of venting or spoiling. I accomplish this by providing an aperture in the vacuum chamber over which is asymmetrically rotatably mounted a slide damper. A change in the position of this slide damper produces only a very small change in the position of the cloud and therefore it provide a fine control which is necessary if the coating on the wire is to be completely uniform.

In addition, I have found that when a wire which is rectangular in cross-section is coated the wide sides should preferably face the vacuum chambers as this arrangement provides the most uniform coating.

DESCRIPTION OF THE INVENTION

FIG. 1 is a side view in cross-section of a certain presently preferred embodiment of an improved fluidized bed according to this invention.

FIG. 2 is a front view of the top portion of the fluidized bed shown in FIG. 1.

In FIGS. 1 and 2 an electrostatic fluidized bed 1 consists of an enclosure 2 which holds a fluidized powder 3. Air enters the fluidized bed through inlet 4 and is charged by charging media 5. The charged air moves through diffusion plate 6, charges the powder 3 and fluidizes it to a level 7. A cloud of charged particles 8 rises above the level of the fluidized powder and coats a grounded wire 9 which passes upward through tube 10. The fluidized bed is provided with vacuum chambers 11 and 12 on each side. A suction is provided at outlet 13 and 14 which draws air through apertures 15, 16, 17 and 18 and out of the bed. In order to coarsely determine the position of cloud 8, guillotine dampers 19, 20, 21, and 22 which control the size of apertures 15, 16, 17, and 18, respectively, are adjustably mounted on the vacuum chambers so as to be vertically slidable. Vacuum chambers 11 and 12 are provided with additional apertures 23 and 24, respectively, which open to the atmosphere. Asymmetrically rotatably mounted slide dampers 25 and 26 are provided to control the size of apertures 23 and 24, respectively.

The apertures which are open to the atmosphere may be positioned anywhere on the vacuum chambers. An aperture size equal to the area of a 1 to 2 inch diameter hole has been found to be suitable.

The fluidized bed may be provided with an additional similarly-constructed vacuum chamber on its other two sides if desired, but these are not believed to be necessary especially if rectangular wire is being coated. It has been found that a more uniform coating is obtained on rectangular wire if the wide sides of the wire face the vacuum chambers.

I claim:

1. In an enclosed electrostatic fluidized bed for coating a vertically moving elongated member by means of a cloud of charged particles, where said electrostatic fluidized bed has two opposing vacuum chambers on its sides for drawing air from the inside of said electrostatic fluidized bed around said cloud for the purpose of controlling the position of said cloud, the improvement comprising venting means leading from each vacuum chamber to the atmosphere, each venting means being provided with adjustable means for controlling the degree of venting.

2. An improvement according to claim 1 wherein each venting means is a single aperture.

3. An improvement according to claim 2 wherein said adjustable means for controlling the size of said aperture is a slide damper which is asymmetrically rotatably mounted on the outside of said vacuum chamber and can be rotated to cover said aperture.

4. An improvement according to claim 2 wherein the area of said aperture is equal to a hole about 1 or 2 inches in diameter.

5. An improvement according to claim 1 wherein said elongated member is rectangular in cross-section and is positioned with its widest sides facing said vacuum chambers.

* * * * *